Sept. 3, 1940.   W. J. F. BOETTCHER   2,213,897
MEAT-TENDERING APPLIANCE
Filed Jan. 3, 1940   2 Sheets-Sheet 1
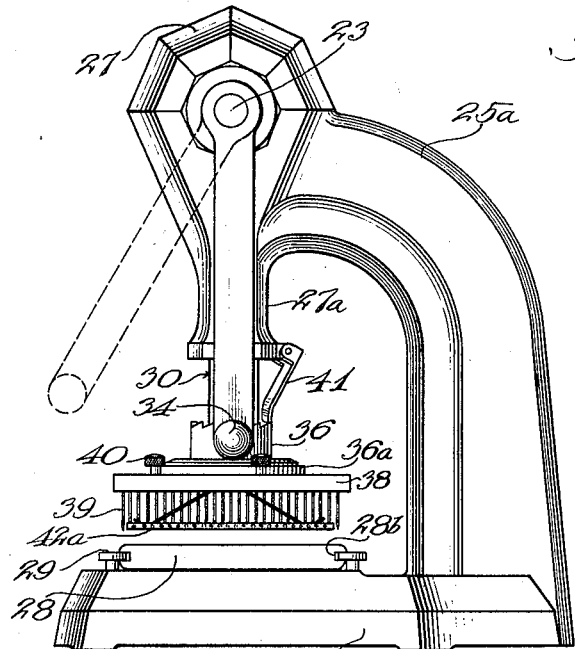
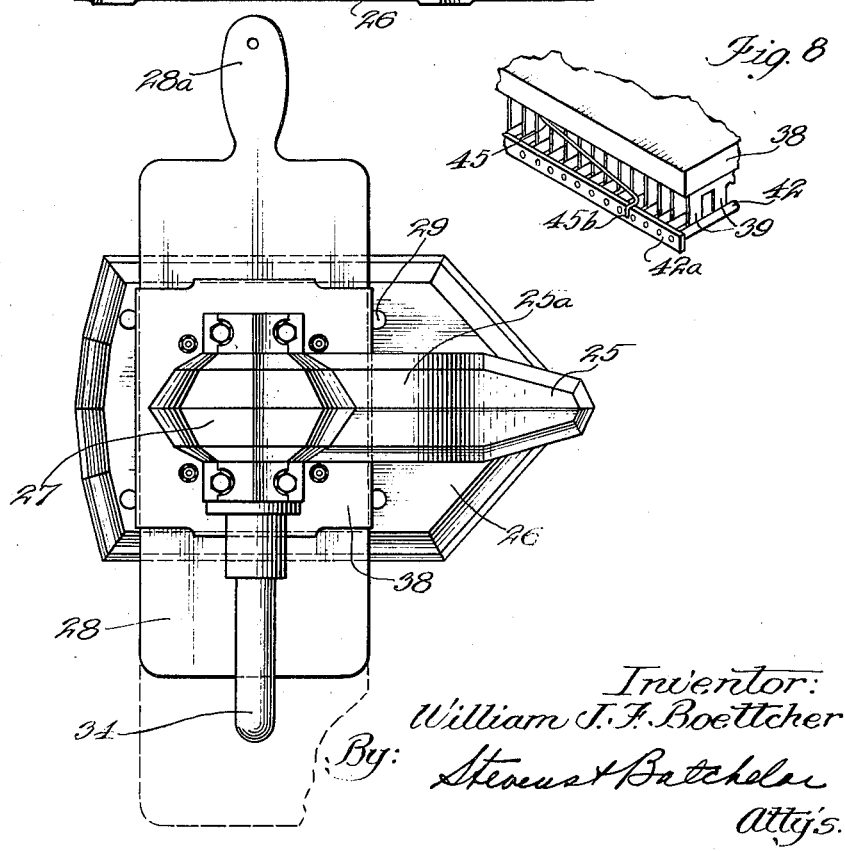
Inventor:
William J. F. Boettcher
By: Stevens & Batchelor
Atty's.

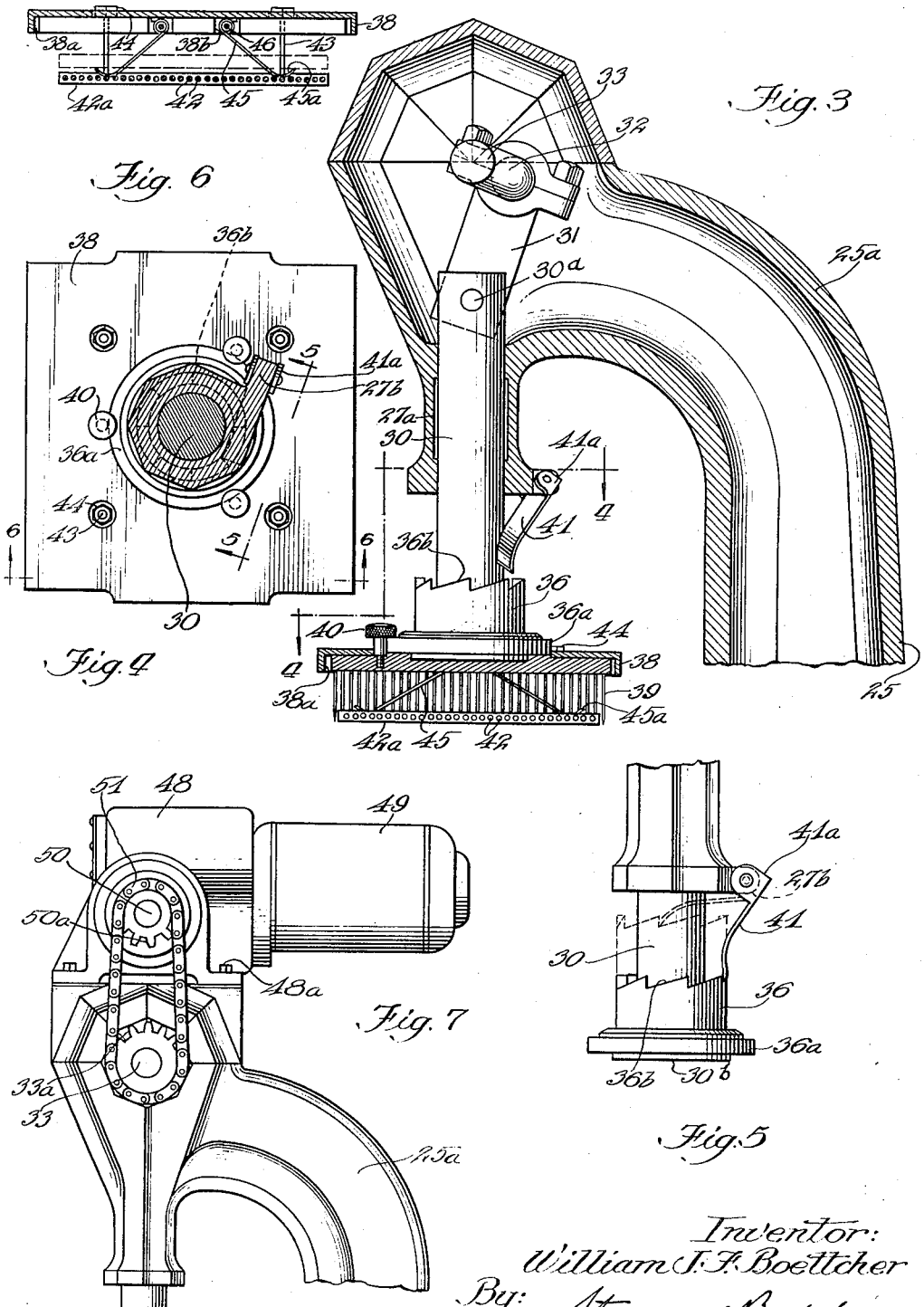

Patented Sept. 3, 1940

2,213,897

UNITED STATES PATENT OFFICE 2,213,897

MEAT-TENDERING APPLIANCE

William J. F. Boettcher, Chicago, Ill.

Application January 3, 1940, Serial No. 312,285

2 Claims. (Cl. 17—25)

This invention is a development of a similar appliance covered in my Patent No. 2,022,842, dated December 3, 1935, along improved lines, and one object of the improved machine is to operate the same with a rotary or cranking motion instead of a reciprocatory one, whereby to facilitate the repeated application of the knife assembly without undue effort.

A further object of the improved structure is to incorporate an automatic turning device for the knife carrier, in order that the hand previously used for this purpose may be free.

Another object of the improvement is to incorporate an internal spring means for the meat-separating grid, whereby to give the machine a neater appearance.

An additional object of the invention is to adapt the same for a power drive.

With the above objects in view and any others that may suggest themselves from the description to follow, a better understanding of the invention may be had by reference to the accompanying drawings, in which—

Fig. 1 is a side elevation of the appliance;

Fig. 2 is a top plan view;

Fig. 3 is an enlarged vertical section of the main portion of the appliance;

Fig. 4 is a section on the line 4—4 of Fig. 3;

Fig 5 is an elevation taken from the line 5—5 of Fig. 4;

Fig. 6 is a section on the line 6—6 of Fig. 4;

Fig. 7 is a partial elevation of the appliance as modified for a power drive; and Fig. 8 is a perspective view of a modification of an element in Fig. 6.

The improved structure has been simplified along basic lines. Thus, specific reference to the drawings indicates that a single bracket 25 rises from the base 26 of the appliance, the bracket taking a forward curvature 25a to terminate with a housing 27. This housing is directly over the area where the board 28 receiving the meat to be tendered is placed on the base 26. Incidentally, the board for the present appliance is elongated, as clearly shown in Fig. 2, and formed with a handle 28a at one end. The side edges of the board are grooved as indicated at 28b to receive guidance from a set of four headed studs 29 as the board is slid upon the base 26 from one side thereof. Thus, the board cannot turn.

The vertical shaft 30 which carries the knife assembly now receives reciprocatory motion by a pivotal connection 30a with a pitman 31 mounted on the crank 32 of a shaft 33 centered in the housing 27. The shaft 33 projects from one side of the latter to receive a crank handle 34, as shown in Fig. 1, the operation of which procures the rising and falling action of the shaft 30. The housing 27 is extended downwardly with a bearing 27a in which the shaft is slidable.

The shaft 30 receives a separate headpiece 36 at the bottom, such headpiece being free to rotate about the shaft and be retained to the same by suitable means, such as a bottom flange 30b of the shaft.

The headpiece 36 supports the knife carrier 38, the same being in the form of a plate from which the knives 39 project downwardly. The carrier 38 is attached to an annular enlargement 36a of the headpiece by means of marginal screws 40, these being easily removable by the user in case the knife carrier is to be taken down for cleaning.

The upper edge of the headpiece 36 is formed with ratchet teeth 36b which are engageable by a pawl 41 which is pivoted by means of ears 41a to an offset 27b of the bearing 27a. Thus, when the shaft 30 is raised, the pawl 41 is engaged by one of the ratchet teeth 36b and being swung upwardly causes the headpiece 36 to rotate partly around the shaft, thus turning the knife assembly accordingly. The knives 39 are flat and chisel-pointed, and it is evident that in descending upon the meat they will cut the same in one direction. Thus, when the carrier 38 receives a partial turn, the next stroke of the knives will be at a different angle, so as to cut the meat accordingly.

I employ a grid 42 in a frame 42a at the bottom of the knife group for separating the meat from the latter when the carrier 38 rises, as in the case of my patented structure. However, the springs employed to depress the grid now differ from the previous structure. Thus, the grid carries a set of screws 43 directed upwardly through the carrier 38 to receive nuts 44, the screws being slidable through the carrier. The latter has a marginal recess 38a on the under side, and in opposite sections of this recess are the springs 45. As noted in Figs. 3 and 6, these springs are inclined and rounded at the bottom as indicated at 45a to seat on the grid along the inner sides of its frame bars 42a. In the modification of Fig. 8 the lower spring ends are hooked over the frame bars, as indicated at 45b, leaving the grid clear. The upper portions of each set of springs are coiled about pins 46 occurring in recesses 38b of the carrier 38, and terminate in contact with the carrier plate. Thus, the springs flex upwardly when the carrier descends upon the meat, and serve to depress the grid when the carrier rises again.

Fig. 7 shows the housing 27 altered to receive a speed reducer 48 from above, by means of bolts 48a, for an electric motor 49. The shaft 50 of the speed reducer projects laterally in a position directly above the shaft 33 of the appliance, and the shafts 50 and 33 are in the modified form provided with sprockets 50a and 33a to receive a connecting chain 51. A suitable control is provided in connection with this mechanism, so that the appliance may operate without manual effort. In the operation of the appliance by either method, the handling of the board 28 is significant. In Fig. 2 the same is shown in a medial position, that is, where the meat is in a single section or piece in the center. However, where several pieces of meat or a long piece is desired to be tendered, such pieces may be laid over the entire length of the board. Then the board may be set with either the middle portion or either end portion under the knife assembly and shifted in one or the other direction as suggested by dotted lines while the appliance is operated, whereby to tender all the meat in a short time.

It will be evident from the above description that I have improved the appliance along lines of simplicity and efficiency. Thus, the base 26 and the board above it are open at the front and sides for the handy deposit and removal of the meat. Further, the mechanism to operate the vertical shaft 30 is enclosed in the housing 27, save for the crank handle 34. Further, the automatic turning device for the headpiece 36 relieves the attendant from turning the knife carrier or watching the same, and facilitates the more rapid and thorough cutting of the meat. Further, the means for separting the grid 42 functions as soon as the headpiece is raised off the board, the operating being confined to the carrier, and no spring projecting above the same. Finally, the appliance is of a simple and rugged character and is readily adaptable for the power drive described.

While I have described the improvement along specific lines, various minor changes and refinements may be made without departing from its principle, and I desire to consider all such changes and refinements as coming within the scope and spirit of the appended claims.

I claim:

1. A meat-tendering appliance comprising a support for the meat, a bearing erected over the support, a vertical shaft slidable in the bearing, a meat tendering unit carried by the lower end of the shaft, a meat-separating grid suspended from the meat tendering unit, and spring means directed from the sides of the latter to the grid in order to keep the same in normally separated relation to the meat tendering unit, said spring means comprising torsion springs attached to the meat tendering unit and diverging inclinedly to bear against the grid.

2. A meat-tendering appliance comprising a support for the meat, a bearing erected over the support, a vertical shaft slidable in the bearing, a meat tendering unit carried by the lower end of the shaft, a meat-separating grid suspended from the meat tendering unit, and spring means directed from the sides of the latter to the grid in order to keep the same in normally separated relation to the meat tendering unit, the grid having a marginal frame, said spring means comprising torsion springs attached to the meat tendering unit and diverging inclinedly to meet the grid, the lower ends of the springs being with hooks to straddle the correspondingly located bars of the frame.

WILLIAM J. F. BOETTCHER.